US011242827B2

(12) United States Patent
Kim et al.

(10) Patent No.: US 11,242,827 B2
(45) Date of Patent: Feb. 8, 2022

(54) DUAL PURGE DEVICE FOR VEHICLE

(71) Applicant: HYUNDAI KEFICO CORPORATION, Gyeonggi-do (KR)

(72) Inventors: Hyung Wook Kim, Gyeonggi-do (KR); Min Ki Kim, Gyeonggi-do (KR); Dong June Kim, Daegu (KR)

(73) Assignee: HYUNDAI KEFICO CORPORATION, Gyeonggi-do (KR)

( * ) Notice: Subject to any disclaimer, the term of this patent is extended or adjusted under 35 U.S.C. 154(b) by 0 days.

(21) Appl. No.: 17/113,272

(22) Filed: Dec. 7, 2020

(65) Prior Publication Data

US 2021/0172410 A1 Jun. 10, 2021

(30) Foreign Application Priority Data

Dec. 9, 2019 (KR) ........................ 10-2019-0162407

(51) Int. Cl.
| | | |
|---|---|---|
| F02B 33/44 | (2006.01) | |
| F02M 35/10 | (2006.01) | |
| F02M 25/08 | (2006.01) | |
| F02M 35/104 | (2006.01) | |

(52) U.S. Cl.
CPC .. *F02M 35/10222* (2013.01); *F02M 25/0836* (2013.01); *F02M 35/104* (2013.01); *F02M 35/10157* (2013.01); *F02M 35/10255* (2013.01)

(58) Field of Classification Search
CPC ......... F02M 35/10222; F02M 25/0836; F02M 35/10157; F02M 35/10255; F02M 35/104
USPC ........ 60/605.1; 123/520, 519, 518, 516, 564
See application file for complete search history.

(56) References Cited

U.S. PATENT DOCUMENTS

| | | | | |
|---|---|---|---|---|
| 8,843,265 B2* | 9/2014 | Sager | ................. | F02M 25/0836 701/33.6 |
| 9,885,323 B1* | 2/2018 | Myers | ................. | F02M 25/089 |
| 2013/0008413 A1* | 1/2013 | Inoguchi | ............ | F02M 25/0836 123/518 |
| 2013/0199504 A1* | 8/2013 | Takeishi | ............. | F02M 25/0809 123/520 |
| 2013/0220282 A1* | 8/2013 | Hadre | .................. | F02M 25/089 123/520 |
| 2013/0263590 A1* | 10/2013 | Kempf | .................... | F02B 33/00 60/605.1 |
| 2015/0096541 A1* | 4/2015 | Edmund | .......... | F02M 35/10222 123/520 |
| 2015/0159665 A1* | 6/2015 | Fletcher | .................. | B60T 13/46 415/58.4 |

(Continued)

FOREIGN PATENT DOCUMENTS

JP         2015169124 A   *   9/2015   ............. Y02T 10/12

*Primary Examiner* — Hung Q Nguyen
*Assistant Examiner* — Anthony Donald Taylor, Jr.
(74) *Attorney, Agent, or Firm* — Mintz Levin Cohn Ferris Glovsky and Popeo, P.C.; Peter F. Corless

(57) ABSTRACT

A dual purge device for a vehicle includes a boost pressure introducing port and a fuel evaporation gas introducing port of an ejector that are directly mounted on an ejector mounting part formed on an intake manifold, and a first purge line connecting a purge valve to an intake manifold introducing pipe, respectively, without requiring a hose. By not using the hose or a quick connector, it is possible to simplify a structure of the dual purge device, and to integrally package the intake manifold, the purge valve, and the ejector, thereby simplifying delivery and assembly.

10 Claims, 7 Drawing Sheets

(56) References Cited

U.S. PATENT DOCUMENTS

| | | | | |
|---|---|---|---|---|
| 2015/0292421 A1* | 10/2015 | Pursifull | ............... | F02D 41/004 123/518 |
| 2015/0369184 A1* | 12/2015 | Bucknell | .......... | F02M 35/10157 123/518 |
| 2016/0069304 A1* | 3/2016 | Guidi | .................... | F02M 26/03 123/518 |
| 2016/0201613 A1* | 7/2016 | Ulrey | .................. | F02D 41/0032 123/520 |
| 2016/0201615 A1* | 7/2016 | Pursifull | ............. | F02D 41/0032 123/520 |
| 2016/0305352 A1* | 10/2016 | Pursifull | ............... | F02D 41/004 |
| 2016/0305377 A1* | 10/2016 | Stefaniak | ............. | F02M 25/089 |
| 2016/0369713 A1* | 12/2016 | Pursifull | ................ | F02B 33/44 |
| 2016/0369721 A1* | 12/2016 | Pursifull | ............... | F02D 41/004 |
| 2016/0377031 A1* | 12/2016 | Pursifull | ............. | F02D 41/0032 60/602 |
| 2016/0377038 A1* | 12/2016 | Bittner | ................ | F02M 25/089 123/533 |
| 2018/0058385 A1* | 3/2018 | Choi | .................... | F02M 25/089 |
| 2018/0087476 A1* | 3/2018 | Amemiya | .......... | F02M 25/0836 |
| 2018/0112634 A1* | 4/2018 | Hoffman | .......... | F02M 35/10229 |
| 2018/0187633 A1* | 7/2018 | Lee | ..................... | F02M 25/089 |
| 2018/0372238 A1* | 12/2018 | Bhandari | ............ | F16K 31/0655 |
| 2019/0048830 A1* | 2/2019 | Akiyama | ............ | F02M 25/089 |
| 2019/0285018 A1* | 9/2019 | Dudar | ................ | F02M 35/1038 |
| 2019/0301402 A1* | 10/2019 | Calavin | ............. | F02M 25/0872 |

* cited by examiner

DUAL PURGE DEVICE FOR VEHICLE

CROSS-REFERENCE(S) TO RELATED APPLICATION(S)

This application claims under 35 U.S.C. § 119 the benefit of Korean Patent Application No. 10-2019-0162407 filed on Dec. 9, 2019, the entire contents of which are incorporated herein by reference.

BACKGROUND

(a) Technical Field

The present disclosure relates to a dual purge device for a vehicle, more particularly, to the dual purge device which allows a fuel evaporation gas to be smoothly introduced into an engine to be combusted even when a turbocharger is operated.

(b) Description of the Related Art

Since a fuel evaporation gas of a fuel tank causes atmospheric pollution when discharged to the atmosphere, as illustrated in FIG. 1 (RELATED ART), the fuel evaporation gas of a fuel tank 1 is collected in a canister 2 and then sucked and combusted into an engine 5 by negative pressure of an intake manifold 4 by opening a purge control solenoid valve (PCSV) 3 when the engine is operated.

However, in a vehicle mounted with a turbocharger 6, since a positive pressure is formed in the intake manifold 4 by a supercharging operation when the turbocharger 6 is operated, the fuel evaporation gas of the canister 2 is not sucked toward the intake manifold 4 even if the purge valve 3 is opened. This causes the fuel odor in warm weather conditions, such as the summer.

Therefore, an ejector 8 is installed on a middle of a pipeline connecting a front end of the intake manifold 4 to a front end of the turbocharger 6, and the ejector 8 is connected to a pipeline connecting the purge valve 3 to the intake manifold 4 such that compressed air of an intake line passes through the ejector 8, and at this time, the fuel evaporation gas sucked to the ejector 8 by negative pressure generated inside the ejector 8 is introduced into the front end of the turbocharger 6 together with the compressed air, and then flows along the intake line to be introduced into the engine 5 to be combusted (as described herein, the upstream side of the flow is referred to as 'front end' and the downstream side thereof is referred to as 'rear end').

However, since the aforementioned conventional dual purge device has a large number of hoses used for connecting each gas entrance (a number of gas entrance ends is three) of the ejector 8 to a point corresponding thereto, and a large number of quick connectors used for connecting each hose, there is a problem in that the device is complicated and assembly thereof is cumbersome.

Further, since the ejector 8 and the hose are connected using a quick connector, a shape of the gas entrance and a size of an inner diameter thereof are limited according to the specification of the quick connector used. Therefore, as illustrated in FIG. 2 (RELATED ART), a shape of a boost pressure introducing port 8a into which boost pressure is introduced is inevitably formed in a simple linear shape as well and an inner diameter (A) thereof is also narrow to a same extent as an inner diameter of an inlet of a nozzle of the boost pressure introducing port 8a, thereby adversely affecting the introduction of a larger amount of compressed air into the ejector 8. This is a factor related to decreasing the purge amount of the fuel evaporation gas.

Further, all of the intake manifold 4, the purge valve 3, and the ejector 8 are configured as individual systems and individually delivered and assembled, such that there are problems in that the cost and time required for logistics and assembly are increased, and the assembling process in an engine room assembling line is complicated.

SUMMARY

The present disclosure provides a dual purge device for a vehicle, which may decrease use of a hose and a quick connector to simplify a structure, increase an introduced amount of compressed air to increase a purge amount of a fuel evaporation gas, and package related components to decrease a cost and time of logistics and assembly and to facilitate the assembly.

The present disclosure includes: an intake manifold, a purge valve mounted on a plenum chamber of the intake manifold via a mounting bracket, a first purge pipeline connecting the purge valve to an introducing pipe of the intake manifold, and an ejector having a boost pressure introducing port directly mounted on an ejector mounting part formed on the plenum chamber, and a fuel evaporation gas introducing port directly mounted on the first purge pipeline.

The ejector is provided with a gas discharging pipe through which the compressed air introduced into the boost pressure introducing port is mixed with the fuel evaporation gas introduced into the fuel evaporation gas introducing port to be discharged, and the gas discharging pipe is connected to the front end of a turbocharger in an engine intake line via a hose to form a second purge pipeline.

A cylindrical mounting part is formed on the boost pressure introducing port of the ejector, and the cylindrical mounting part is fused by a spin on the ejector mounting part of the plenum chamber.

A check valve is provided inside the cylindrical mounting part, and configured to allow the gas movement to the ejector and block the gas movement in the opposite direction thereof.

The first purge pipeline includes: a first pipe connected to the discharging port of the purge valve, a third pipe connected to a fuel evaporation gas introducing port formed on the introducing pipe of the intake manifold, and a second pipe connecting the first pipe, the third pipe, and the fuel evaporation gas introducing port of the ejector.

The second pipe includes: a transverse pipe connecting the first pipe to the third pipe, a longitudinal pipe branched from the middle of the transverse pipe, an extension extending by being bent from the end of the longitudinal pipe, and a disk-shaped mounting part formed on the extension, and the disk-shaped mounting part is fused by a spin on the cylindrical mounting part formed on the fuel evaporation gas introducing port of the ejector.

A check valve is provided inside the cylindrical mounting part, and configured to allow the gas movement to the ejector and block the gas movement in the opposite direction thereof.

A check valve configured to allow the gas movement from the second pipe to the third pipe and block the gas movement in the opposite direction thereof is provided on a side of the third pipe based on the longitudinal pipe in the transverse pipe of the second pipe.

A boost pressure discharging port is formed through the ejector mounting part, and the boost pressure discharging port includes: an outlet having the same diameter as the inlet of a nozzle formed on the boost pressure introducing port of the ejector, a tapered part whose diameter gradually expands as it moves away from the outlet, and an inlet having the same diameter as the maximum diameter of the tapered part.

A guide wall configured to guide the air flow inside the plenum chamber around the inlet to the boost pressure discharging port is formed to protrude from the inner surface of the plenum chamber of the intake manifold.

As described above, the present disclosure may directly mount the boost pressure introducing port of the ejector on the intake manifold, and directly connect the fuel evaporation gas introducing port of the ejector to the first purge line, thereby decreasing the number of hoses and the number of quick connectors to decrease the assembly time as well as simplifying the structure.

Since the quick connector is not used, the shape limitation of the path through which the compressed air is introduced to the ejector is decreased, such that it is possible to expand the inner diameter of the inlet of the compressed air introduced path, to apply the tapered shape, and to form the guide wall around the inlet, thereby increasing the introduced amount of the compressed air to increase the purge amount of the fuel evaporation gas.

Since the boost pressure introducing port of the ejector is directly mounted on the plenum chamber of the intake manifold, the plenum chamber serves as the large-capacity reservoir, such that it is possible to smoothly supply the compressed air to the ejector at all times.

It is possible to package the intake manifold, the ejector, and the purge valve, thereby decreasing the cost and time required for the individual logistics thereof, and further facilitating the assembly work in the engine room assembly line and decreasing the assembly time.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIGS. 5 and 6 are cross-sectional diagrams taken along the line I-I illustrated in FIG. 4, in which FIG. 5 is a diagram illustrating the movement path of a fuel evaporation gas when a turbocharger is not operated, and FIG. 6 is a diagram illustrating the movement path of the fuel evaporation gas when the turbocharger is operated.

DETAILED DESCRIPTION

Figure 1:
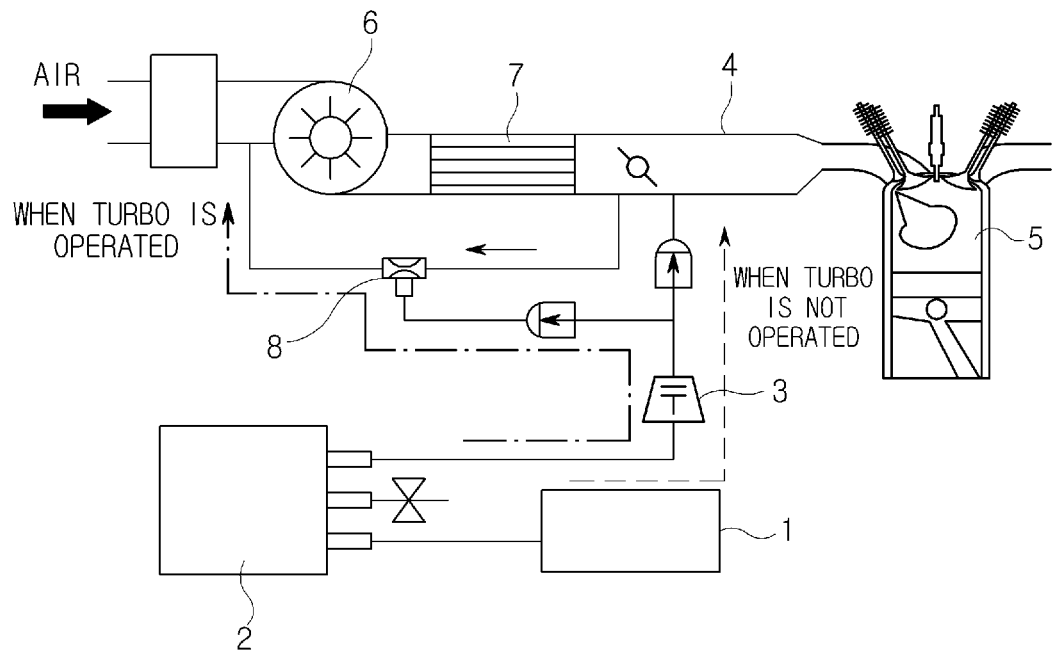
FIG. 1 (RELATED ART) is a diagram illustrating a configuration of a dual purge device for a vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Since the exemplary embodiments according to the present disclosure may be variously changed and have various forms, specific exemplary embodiments will be illustrated in the drawings and described in detail. However, this is not intended to limit the present disclosure to a particular disclosed form, and it should be understood that the present disclosure includes all changes, equivalents, and substitutes included in the spirit and technical scope of the present disclosure. The thicknesses of the lines, the sizes of the components illustrated in the accompanying drawings, or the like may be exaggeratedly illustrated for clarification and convenience of the description.

Further, terms to be described later are terms defined in consideration of functions in the present disclosure and may vary according to the intentions or cases of users and operators. Therefore, these terms should be defined based on the contents throughout the present disclosure.

Hereinafter, a preferred exemplary embodiment of the present disclosure will be described in detail with reference to the accompanying drawings.

As illustrated in FIGS. 3 to 7, a dual purge device for a vehicle according to the present disclosure includes an intake manifold 10, a purge valve 20, an ejector 30, and a first purge pipeline 40.

The intake manifold 10 is a component that is arranged at the distal end of an intake system and is mounted on an intake port of an engine cylinder head, and serves to evenly distribute the sucked air to each cylinder of an engine. The intake manifold 10 is formed with an introducing pipe 11 on the front center thereof, formed with a plenum chamber 12 connected to the introducing pipe 11, and formed with runners 13 which are the same in number as cylinders and a discharging port (not illustrated) on a back surface of the plenum chamber 12. The plenum chamber is a term indicating a space inside the intake manifold, and the runner 13 is a term indicating an individual path branched from the plenum chamber, where these terms are used to indicate members forming the plenum chamber and the runner, respectively, in the present disclosure.

An inlet of the introducing pipe 11 is formed with a square-shaped flange 11a such that an electronic throttle control (ETC) system may be mounted thereon. A top of the introducing pipe 11 is composed of a separate cover member 14, and the cover member 14 is formed with a map sensor installation hole 14a and a fuel evaporation gas introducing port 14b.

The purge valve (e.g., a purge control solenoid valve (PCSV)) 20 is composed of a valve part at the top and a connector part at the bottom. An introducing port 21 and a discharging port 22 of the fuel evaporation gas are formed on the valve part, and a connector 23 for supplying a power source is formed on the connector part.

Further, a bracket coupling part 24 is formed on an opposite portion of the connector 23, and one end of a mounting bracket 25 is inserted into and fixed to the bracket coupling part 24. The other end of the mounting bracket 25 is fixed to one side of the plenum chamber 12 of the intake manifold 10 by a bolt.

The ejector 30 is mounted on an ejector mounting part 12a formed on a top edge of one side of the plenum chamber 12. The ejector mounting part 12a is formed in a cylindrical shape having a low height, and a boost pressure discharging port 12b is formed to penetrate an inside of the ejector mounting part 12a.

The ejector 30 is formed with a boost pressure introducing port 32 whose inner end has a nozzle shape on one end (see bottom end in FIG. 7) in a center axis direction of a cylindrical main body 31, and a cylindrical mounting part 32a is formed on the end of the boost pressure introducing port 32.

The fuel evaporation gas introducing port 33 is formed on one side of a circumferential surface of the main body 31 in the direction perpendicular to the center axis direction, and a cylindrical mounting part 33a is also formed on an end of the fuel evaporation gas introducing port 33.

Check valves 34, 35 are installed on the two cylindrical mounting parts 32a, 33a, and may be formed in a disk shape. Gas movement to the inside of the ejector 30, that is, toward the main body 31 is allowed, and the gas movement in the opposite direction thereof is blocked by the check valves 34, 35.

The other end of the main body 31 in the center axis direction is coupled to a gas discharging pipe 36 to which a hose connecting the ejector 30 to the front end of the turbocharger on the intake path of the engine is connected. A fuel evaporation gas movement path formed by the hose connecting the gas discharging pipe 36 to the front end of the turbocharger forms a second purge pipeline distinguished from the first purge pipeline 40.

The second purge pipeline connects the gas discharging pipe 36 to the front end of the turbocharger in the engine intake line.

The ejector 30 configured as described above is mounted on the ejector mounting part 12a of the plenum chamber 12 by a spin fusion method. That is, the cylindrical mounting part 32a of the boost pressure introducing port 32 side of the ejector 30 is in contact with the top surface of the ejector mounting part 12a of the plenum chamber 12, and rotated at a high speed in the pressed state. The surfaces of the ejector mounting part 12a and the cylindrical mounting part 32a are fused to each other by the frictional heat generated at that time.

As described above, the ejector 30 is first mounted on the intake manifold 10 and then the cylindrical mounting part 32a of the fuel evaporation gas introducing port 33 side of the ejector 30 is mounted with a second pipe 42, which is one component of the first purge pipeline 40, using the same spin fusion method.

The first purge pipeline 40 includes a first pipe 41, the second pipe 42, a third pipe 43, and a check valve 44 installed on one side of the second pipe 42.

The first pipe 41 has one end connected to the discharging port 22 of the purge valve 20 and the other end connected to one end of the second pipe 42.

The third pipe 43 has one end connected to the other end of the second pipe 42 and the other end connected to the fuel evaporation gas introducing port 14b formed on the cover member 14 of the intake manifold 10.

The first pipe 41 and the third pipe 43 preferably have an L shape and a linear shape, respectively, but the pipes may be elastically deformed by a predetermined amount, thereby absorbing a relative location error of the connection portion of both ends thereof through the appropriate deformation.

The second pipe 42 is a pipe having approximately a T shape, and includes a transverse pipe connecting the first pipe 41 to the third pipe 43, and a longitudinal pipe formed by being branched upward from the middle of the transverse pipe.

A check valve 44 for allowing the gas movement from the second pipe 42 to the third pipe 43 and blocking the gas movement in the opposite direction thereof is installed on the portion of the third pipe 43 side based on the longitudinal pipe in the transverse pipe. The check valve 44 is disposed in the transverse pipe of the second pipe 42. The check valve 44 is disposed in a portion of the transverse pipe of the second pipe 42, such that the portion is disposed on a side of the third pipe 43 based of the longitudinal pipe.

An extension 42a is disposed on the end of the longitudinal pipe, and extends by being bent substantially at a right angle. A disk-shaped mounting part 42b is formed on the end of the extension 42a (see FIG. 7).

The disk-shaped mounting part 42b of the second pipe 42 is in contact with the cylindrical mounting part 33a formed on the fuel evaporation gas introducing port 33 of the ejector 30, and then fused by the spin, such that the second pipe 42 is integrally mounted on the ejector 30.

Then, the first pipe 41 and the third pipe 43 are connected to both ends of the second pipe 42, respectively.

Now, the operations and effects of the dual purge device according to the present disclosure will be described.

Figure 5:
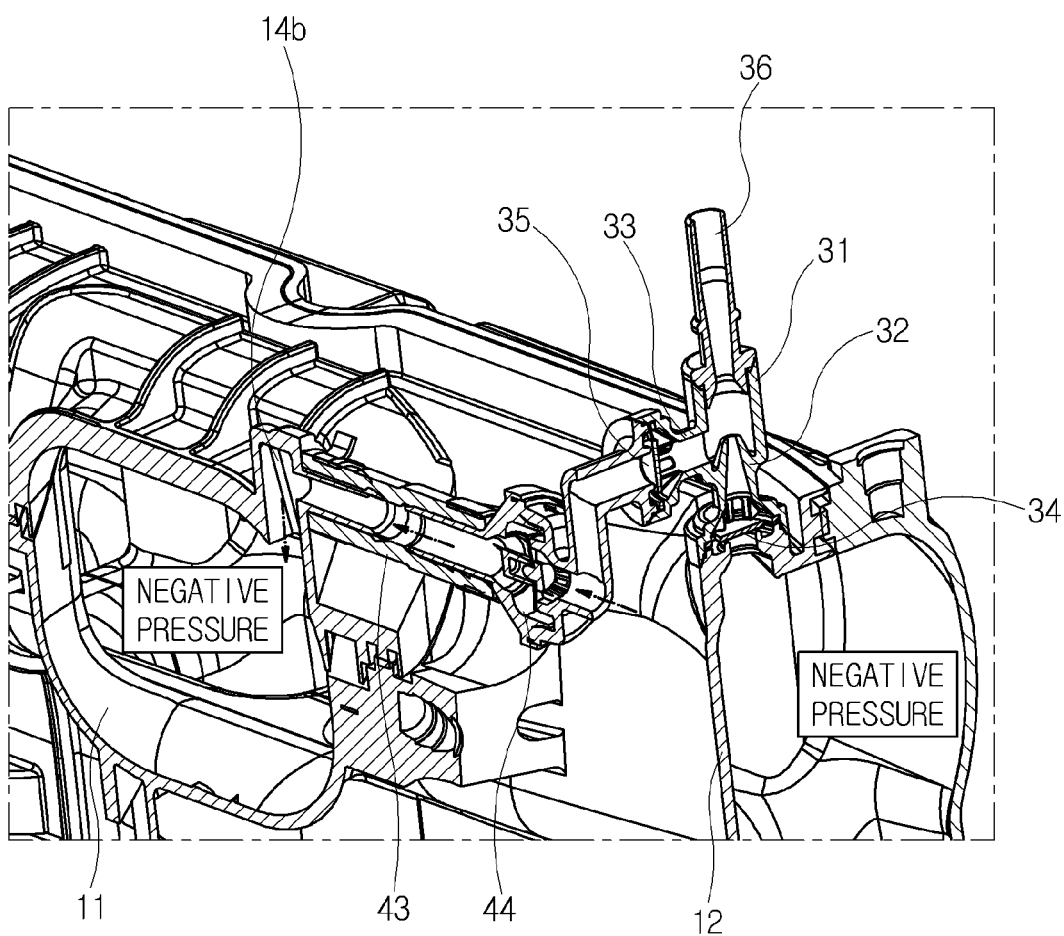

FIG. 5 illustrates a purge path when the turbocharger is not operated. Since the negative pressure is formed inside the intake manifold 10 by the operation of a piston of the engine when the turbocharger is not operated, the check valve 34 of the boost pressure introducing port 32 side of the ejector 30 is blocked, the check valve 44 of the second pipe 42 is opened, and the check valve 35 at the fuel evaporation gas introducing port 33 side of the ejector 30 is also blocked by the negative pressure transferred through the third pipe 43 and the second pipe 42. That is, all of the check valves 34, 35 of the ejector 30 among three check valves are blocked, and only the check valve 44 of the second pipe 42 is opened.

Therefore, when the purge valve 20 is opened, the fuel evaporation gas is introduced into the introducing pipe 11 of the intake manifold 10 through the first pipe 41, the second pipe 42, and the third pipe 43, that is, the first purge pipeline 40, and moved to the cylinder together with the air introduced into the introducing pipe 11 to be combusted.

Figure 6:
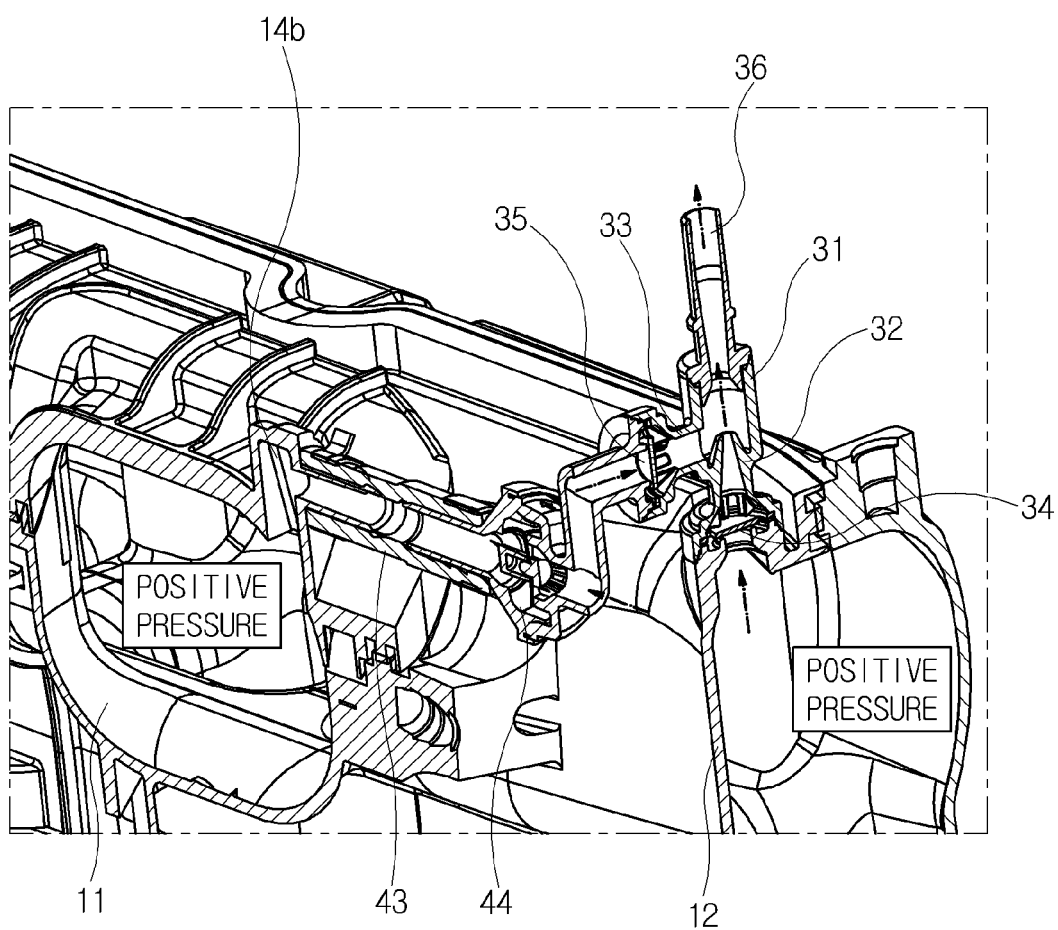
Figure 7:
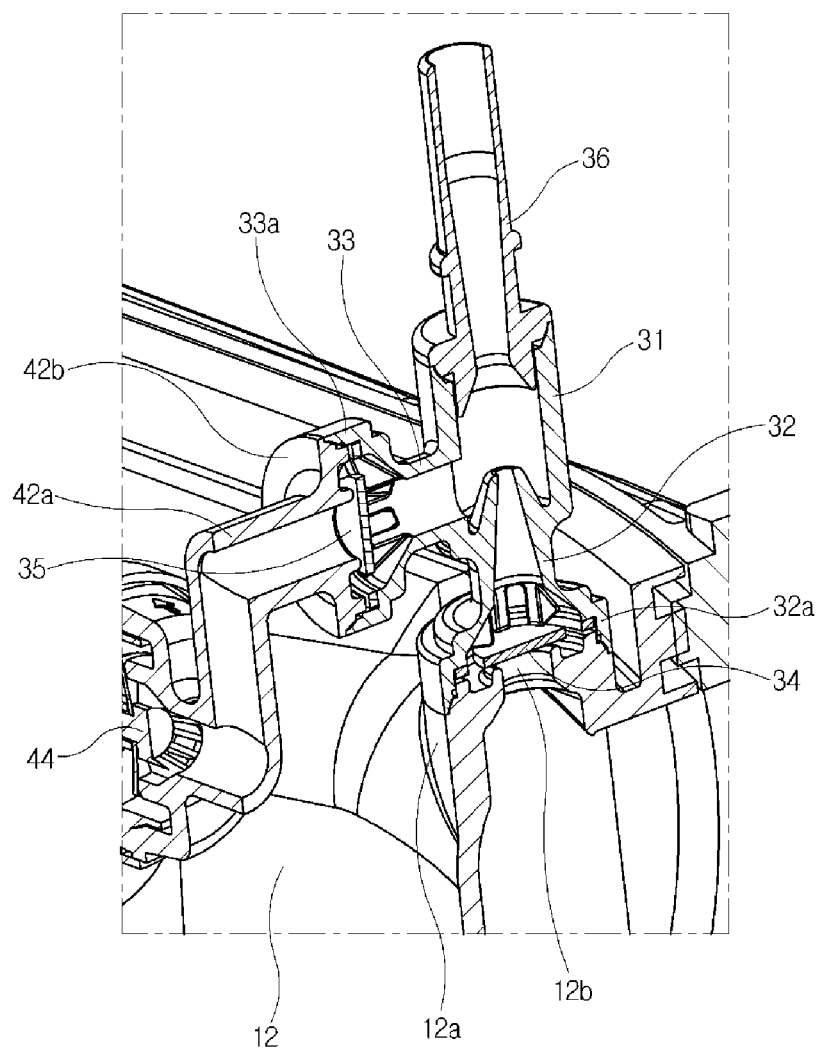
FIG. 7 is a cross-sectional enlarged diagram of an ejector and a connection part thereof.

Meanwhile, since the positive pressure is formed inside the intake manifold 10 when the turbocharger is operated, as illustrated in FIG. 6, the check valve 34 of the boost pressure introducing port 32 side of the ejector 30 is opened, the check valve 35 of the fuel evaporation gas introducing port 33 side of the ejector 30 is opened by the negative pressure within the main body 31 formed by discharging the compressed air through the nozzle of the boost pressure introducing port 32 at a high speed, and the check valve 44 of the second pipe 42 to which the positive pressure is applied on the introducing pipe 11 side through the third pipe 43 is blocked.

Therefore, when the purge valve 20 is opened, the fuel evaporation gas is moved through the first pipe 41, the one side transverse pipe, longitudinal pipe, and extension 42a of the second pipe 42, and the fuel evaporation gas introducing port 33 of the ejector 30, mixed with the compressed air introduced into the boost pressure introducing port 32 from the main body 31 to be discharged through the gas discharging pipe 36, and introduced into the front end of the turbocharger through the hose connected to the gas discharging pipe 36. Then, the fuel evaporation gas mixed with the compressed air is supplied to the engine through the general intake path to be combusted.

As described above, the fuel evaporation gas is supplied to the engine to be combusted even in the area in which the turbocharger is operated as well as the area in which the turbocharger is not operated, such that the operation of the dual purge device for preventing the fuel evaporation gas from being leaked to the outside is normally performed regardless of whether the turbocharger is operated.

As described above, in the present disclosure, the boost pressure introducing port 32 of the ejector 30 is directly mounted on the intake manifold 10, and the fuel evaporation gas introducing port 33 is directly mounted on the first purge pipeline 40 connecting the purge valve 20 to the intake manifold 10, such that it is unnecessary to install the hoses between the boost pressure introducing port 32 and the intake manifold 10 and between the fuel evaporation gas introducing port 33 and the first purge pipeline 40. Further, it is unnecessary to also use the quick connector used for both ends of these hoses. As described above, by not using two hoses and four quick connectors having the lengths longer than those of the conventional one, it is possible to simplify the structure of the dual purge device, and to facilitate the assembly.

Further, conventionally, all of the intake manifold, the purge valve, and the ejector are individually delivered and assembled in the engine room assembly line, but in the present disclosure, it is possible to manufacture and deliver the intake manifold 10, the purge valve 20, and the ejector 30 as one package, thereby decreasing the cost and time of logistics related to these components, largely decreasing the assembly time in the engine room assembly line, and also facilitating the assembly work.

Further, as described above, by not applying the hose to be shortened by the path corresponding to the length of the hose, it is possible to implement the purge of the fuel evaporation gas more quickly when the turbocharger is operated (i.e., an improvement in the reactivity).

Further, the gas entrance of the ejector instead of the quick connector is connected to each corresponding portion by the fusion, thereby improving the reliability for the leak of the connection part.

Meanwhile, since the present disclosure does not connect the hose to the boost pressure introducing port 32 side of the ejector 30, the shape or size of the path through which the boost pressure of the ejector 30 is introduced is not limited by the specification of the quick connector for connecting the hose.

That is, it is possible to vary the shape of the path through which the boost pressure of the ejector 30 is introduced.

Therefore, the present disclosure forms the inner diameter portion of the ejector mounting part 12a of the intake manifold 10 mounted with the cylindrical mounting part 32a of the boost pressure introducing port 32, that is, the shape of the boost pressure discharging port 12b as follows.

Figure 2:
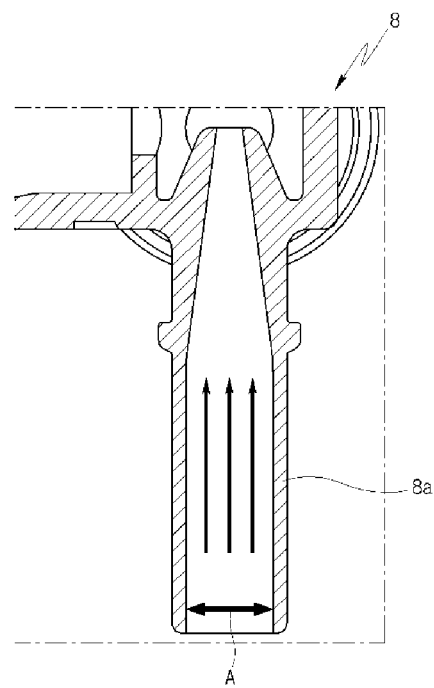
FIG. 2 (RELATED ART) is a cross-sectional diagram of a boost pressure introducing port of a conventional ejector.
Figure 3:
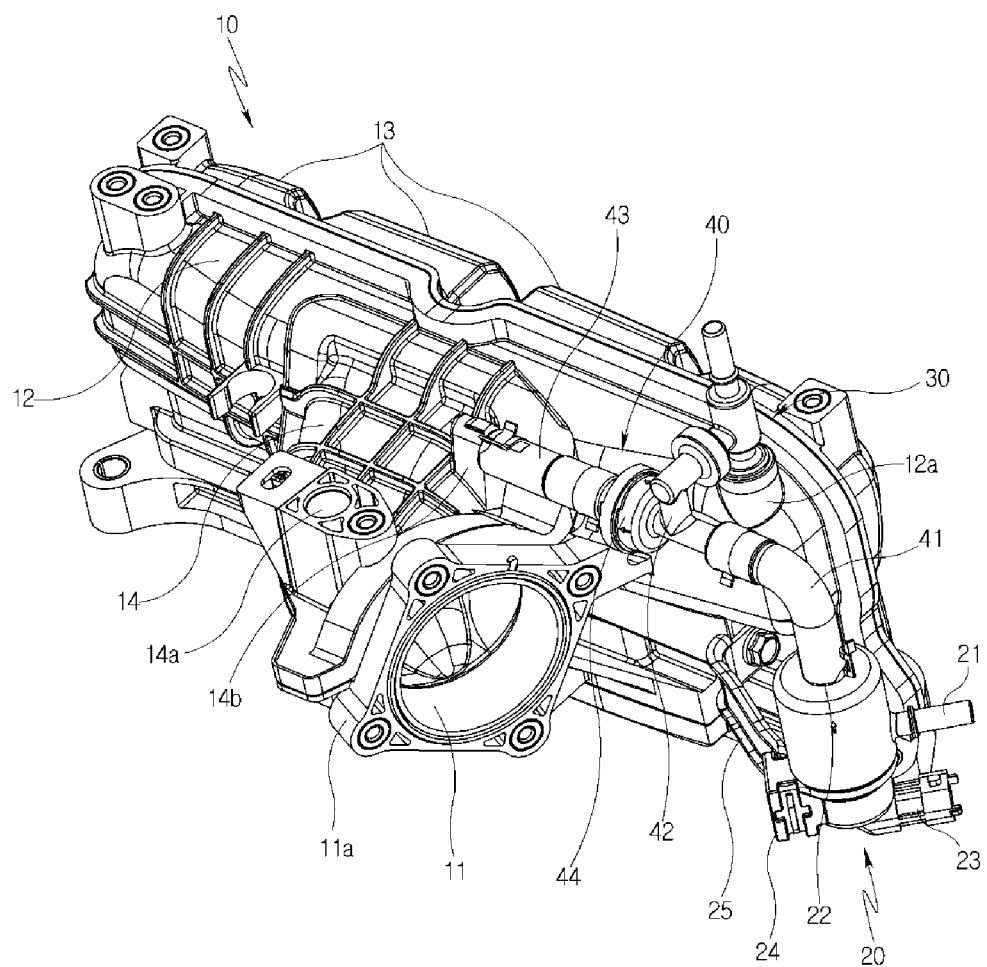
FIG. 3 is a perspective diagram of a dual purge device for a vehicle according to the present disclosure.
Figure 4:
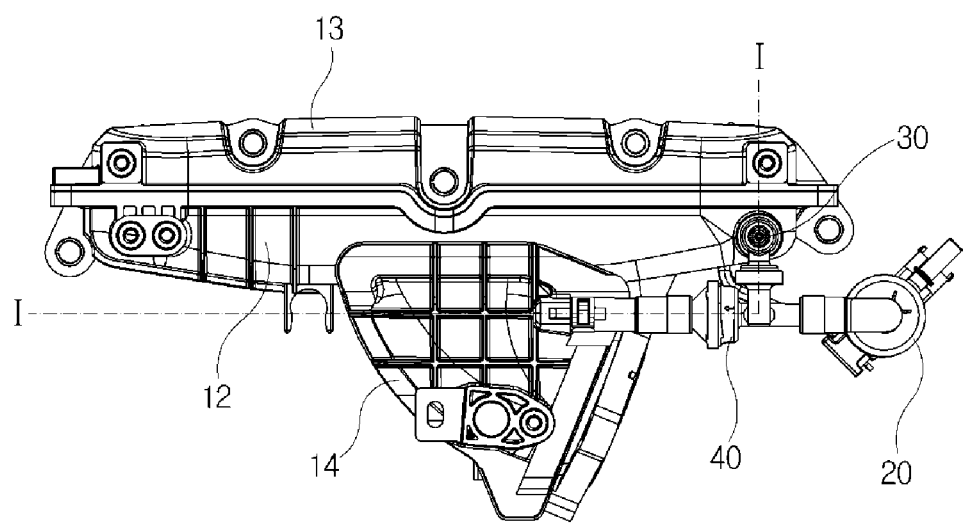
FIG. 4 is a plan diagram of FIG. 3.
Figure 8:
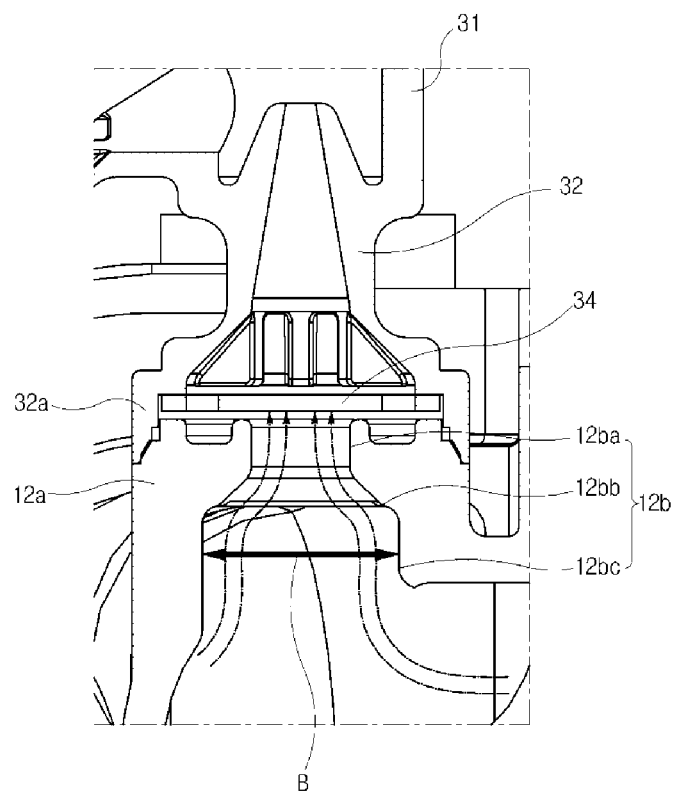
FIG. 8 is a cross-sectional diagram of a boost pressure introducing port of the ejector compared to FIG. 2.

As illustrated in FIG. 8, an outlet 12ba of the boost pressure discharging port 12b is formed to have substantially the same diameter (see A in FIG. 2) as the diameter of the inlet of the nozzle of the boost pressure introducing port 32 of the ejector 30.

The lower portion of the outlet 12ba is formed with a tapered part 12bb whose diameter is gradually increased toward the inside of the plenum chamber 12.

Further, the lower portion of the tapered part 12bb is formed with an inlet 12bc having the same diameter as the maximum diameter of the tapered part 12bb.

As described above, the boost pressure discharging port 12b of the intake manifold 10 has the inlet 12bc with the inner diameter (B) larger than the diameter of the outlet 12ba, such that a larger amount of air may be introduced.

Further, the tapered part 12bb whose diameter is naturally decreased after the inlet 12bc exists, such that a large amount of air introduced into the inlet 12bc may be moved to the outlet 12ba more smoothly.

That is, a larger amount of compressed air may be smoothly introduced into the ejector 30 through the boost pressure discharging port 12b by the operation of the inlet 12bc and the tapered part 12bb.

Therefore, a larger amount of air may be discharged to the nozzle of the end of the boost pressure introducing port 32 of the ejector 30 at a high speed, thereby increasing the size of the negative pressure formed in the main body 31, such that a larger amount of fuel evaporation gases may be introduced into and discharged from the ejector 30 through the fuel evaporation gas introducing port 33.

Therefore, the fuel evaporation gas is supplied to the engine to be combusted more actively, thereby improving the purge performance of the dual purge device.

Figure 9:
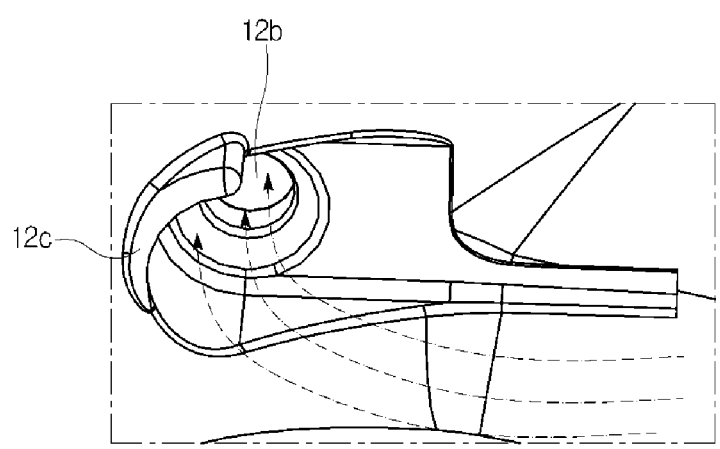
FIG. 9 is a diagram illustrating the inner shape of a portion of an intake manifold in which the boost pressure introducing port of the ejector is mounted.

Meanwhile, to increase the amount of compressed air discharged to the ejector 30, as illustrated in FIG. 9, a guide wall 12c may be formed.

The guide wall 12c is formed to protrude downward from the inside surface of the plenum chamber 12 on the circumference of the inlet 12bc of the boost pressure discharging port 12b. The path of the air flow moving from the inside of the plenum chamber 12 toward the boost pressure discharging port 12b is changed by the guide wall 12c without passing through the boost pressure discharging port 12b to move the air flow toward the boost pressure discharging port 12b, such that a larger amount of air may be discharged to the boost pressure discharging port 12b, thereby finally helping to improve the purge performance.

Meanwhile, the present disclosure may directly mount the boost pressure introducing port 32 of the ejector 30 on the intake manifold 10 such that the entire inner space of the intake manifold 10, in which the positive pressure is formed when the turbocharger is operated, may be used as a kind of a reservoir in which the compressed air is stored.

Therefore, the present disclosure may help to supply the compressed air to the ejector seamlessly, sufficiently, and smoothly when the turbocharger is operated, thereby continuously implementing the purge of the fuel evaporation gas when the turbocharger is operated.

As described above, the present disclosure has been described with reference to the exemplary embodiment illustrated in the drawings, but this is merely illustrative, and it will be understood to those skilled in the art to which the present disclosure pertains that various modifications and other equivalent exemplary embodiments are possible. Therefore, the true technical scope of the present disclosure should be defined by the appended claims.

What is claimed is:

1. A dual purge device for a vehicle, comprising:
   an intake manifold;
   a purge valve coupled to a plenum chamber of the intake manifold via a mounting bracket;
   a first purge pipeline connecting the purge valve to an introducing pipe of the intake manifold; and
   an ejector having a boost pressure introducing port directly mounted on an ejector mounting part formed on the plenum chamber of the intake manifold, and a fuel evaporation gas introducing port directly mounted on the first purge pipeline.

2. The dual purge device of claim 1,
   wherein the ejector comprises a gas discharging pipe through which compressed air introduced into the boost pressure introducing port is mixed with fuel evaporation gas introduced into the fuel evaporation gas introducing port and discharged, and
   wherein the gas discharging pipe comprises a second purge pipeline connecting the gas discharging pipe to a front end of a turbocharger in an engine intake line.

3. The dual purge device of claim 1,
   wherein the ejector comprises a cylindrical mounting part formed on the boost pressure introducing port, and
   wherein the cylindrical mounting part is fused by spinning onto the ejector mounting part formed on the plenum chamber of the intake manifold.

4. The dual purge device of claim 3, wherein a check valve is provided inside of the cylindrical mounting part, the check valve configured to allow gas movement to the ejector and block the gas movement in an opposite direction thereof.

5. The dual purge device of claim 1, wherein the first purge pipeline comprises:
   a first pipe connected to a discharging port of the purge valve;
   a second pipe connected to the first pipe and the fuel evaporation gas introducing port; and
   a third pipe connected to the second pipe and the introducing pipe of the intake manifold.

6. The dual purge device of claim 5, wherein the second pipe comprises:
   a transverse pipe connecting the first pipe to the third pipe, a longitudinal pipe branched from a middle portion of the transverse pipe, an extension extending by being bent from an end of the longitudinal pipe, and a disk-shaped mounting part formed on the extension, and
   wherein the disk-shaped mounting part is fused by spinning onto a cylindrical mounting part formed on the fuel evaporation gas introducing port of the ejector.

7. The dual purge device of claim 6, wherein a check valve is provided inside of the cylindrical mounting part, the check valve configured to allow gas movement to the ejector and block the gas movement in an opposite direction thereof.

8. The dual purge device of claim 6, wherein a check valve is disposed between an end of the transverse pipe of the second pipe and the third pipe, the check valve configured to allow gas movement from the second pipe to the third pipe and block the gas movement in an opposite direction thereof.

9. The dual purge device of claim 1,
   wherein a boost pressure discharging port is formed through the ejector mounting part,
   wherein the boost pressure discharging port comprises:
   an outlet having a same diameter as an inlet of a nozzle formed on the boost pressure introducing port of the ejector;
   a tapered part having a diameter that gradually expands in a direction moving away from the outlet and toward the plenum chamber of the intake manifold; and
   an inlet having a same diameter as a maximum diameter of the tapered part.

10. The dual purge device of claim 9, wherein a guide wall is disposed on an inner surface of the plenum chamber of the intake manifold, the guide wall configured to guide air flow inside of the plenum chamber of the intake manifold around the inlet and to the boost pressure discharging port.

* * * * *